United States Patent
Baughman et al.

(10) Patent No.: US 10,439,891 B2
(45) Date of Patent: Oct. 8, 2019

(54) HYPERPARAMETER AND NETWORK TOPOLOGY SELECTION IN NETWORK DEMAND FORECASTING

(71) Applicant: INTERNATIONAL BUSINESS MACHINES CORPORATION, Armonk, NY (US)

(72) Inventors: Aaron K. Baughman, Silver Spring, MD (US); Brian M. O'Connell, Cary, NC (US); Michael Perlitz, Ashburn, VA (US); Stefan A. G. Van Der Stockt, Johannesburg (ZA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 644 days.

(21) Appl. No.: 14/247,599

(22) Filed: Apr. 8, 2014

(65) Prior Publication Data
US 2015/0288573 A1    Oct. 8, 2015

(51) Int. Cl.
*G06F 9/44* (2018.01)
*G06N 7/02* (2006.01)
(Continued)

(52) U.S. Cl.
CPC ........... *H04L 41/147* (2013.01); *G06N 3/126* (2013.01); *H04L 41/145* (2013.01)

(58) Field of Classification Search
None
See application file for complete search history.

(56) References Cited

U.S. PATENT DOCUMENTS 6,782,499 B2    8/2004 Osada et al.
6,892,191 B1 *  5/2005 Schaffer ............ G06F 17/30705
                                                              706/13
(Continued)

FOREIGN PATENT DOCUMENTS

CA    2401057    9/2001
CN    102135914  7/2011
(Continued)

OTHER PUBLICATIONS

Office Action dated Dec. 4, 2015 in related U.S. Appl. No. 14/247,594, 8 pages.
(Continued)

*Primary Examiner* — Luis A Sitiriche
(74) *Attorney, Agent, or Firm* — William Hartwell; Andrew M. Calderon; Roberts Mlotkowski Safran Cole & Calderon, P.C.

(57) ABSTRACT

Approaches for optimizing network demand forecasting models and network topology using hyperparameter selection are provided. An approach includes defining a pool of features that are usable in models that predict demand of network resources, wherein the pool of features includes at least one historical forecasting feature and at least one event forecasting feature. The approach also includes generating, using a computer device, an optimal model using a subset of features selected from the pool of features. The approach further includes predicting future demand on a network using the optimal model. The approach additionally includes allocating resources in the network based on the predicted future demand.

21 Claims, 7 Drawing Sheets

(51) Int. Cl.
*G06N 7/06* (2006.01)
*H04L 12/24* (2006.01)
*G06N 3/12* (2006.01)

(56) References Cited

U.S. PATENT DOCUMENTS

| | | | |
|---|---|---|---|
| 7,093,143 B2 | 8/2006 | Ito et al. | |
| 7,141,883 B2 | 11/2006 | Wei et al. | |
| 7,161,828 B2 | 1/2007 | Cummings et al. | |
| 7,254,797 B2 | 8/2007 | Garlepp | |
| 8,571,467 B2 | 10/2013 | Uusitalo et al. | |
| 8,578,028 B2 | 11/2013 | Grigsby et al. | |
| 8,612,599 B2 | 12/2013 | Tung et al. | |
| 8,621,080 B2 | 12/2013 | Iyoob et al. | |
| 9,336,259 B1* | 5/2016 | Kane | G06F 17/30592 |
| 2002/0161891 A1* | 10/2002 | Higuchi | G06F 11/004 709/226 |
| 2003/0145110 A1* | 7/2003 | Ohnishi | G06N 3/126 709/242 |
| 2005/0131847 A1* | 6/2005 | Weston | G06K 9/623 706/12 |
| 2007/0106550 A1* | 5/2007 | Umblijs | G06Q 10/0631 705/7.12 |
| 2009/0157541 A1* | 6/2009 | Sutton | G06Q 40/04 705/37 |
| 2009/0265707 A1 | 10/2009 | Goodman et al. | |
| 2010/0027426 A1* | 2/2010 | Nair | H04W 28/16 370/238 |
| 2011/0112441 A1 | 5/2011 | Burdea | |
| 2012/0005148 A1 | 1/2012 | Horvitz et al. | |
| 2012/0144038 A1* | 6/2012 | Hildebrand | H04L 41/0806 709/226 |
| 2012/0303413 A1* | 11/2012 | Wang | G06Q 10/0631 705/7.31 |
| 2012/0311657 A1 | 12/2012 | Boldyrev et al. | |
| 2012/0329384 A1 | 12/2012 | Boldyrev et al. | |
| 2013/0073490 A1 | 3/2013 | Baughman et al. | |
| 2013/0086431 A1 | 4/2013 | Arndt et al. | |
| 2013/0219067 A1 | 8/2013 | Boss et al. | |
| 2013/0254374 A1 | 9/2013 | Bogdany et al. | |
| 2013/0263019 A1 | 10/2013 | Castellanos et al. | |
| 2013/0273959 A1 | 10/2013 | Wu et al. | |
| 2013/0275961 A1 | 10/2013 | Anderson et al. | |
| 2013/0290542 A1 | 10/2013 | Watt et al. | |
| 2013/0290598 A1 | 10/2013 | Fiske et al. | |
| 2014/0006377 A1 | 1/2014 | Astore | |
| 2014/0040883 A1 | 2/2014 | Tompkins | |
| 2014/0047272 A1 | 2/2014 | Breternitz et al. | |
| 2014/0053226 A1 | 2/2014 | Fadida et al. | |
| 2014/0055458 A1 | 2/2014 | Bogdany et al. | |
| 2014/0059226 A1 | 2/2014 | Messerli et al. | |
| 2014/0079297 A1 | 3/2014 | Tadayon et al. | |
| 2014/0165063 A1 | 6/2014 | Shiva | |

FOREIGN PATENT DOCUMENTS

| | | |
|---|---|---|
| CN | 102385719 | 3/2012 |
| CN | 103036974 | 4/2013 |
| CN | 103095533 | 5/2013 |
| CN | 103220365 | 7/2013 |
| CN | 103577268 | 2/2014 |
| WO | 2001080158 | 10/2001 |
| WO | 201310262 | 1/2013 |
| WO | 201339555 | 3/2013 |

OTHER PUBLICATIONS

Rak et al., "Cloud-based Concurrent Simulation at Work: Fast Performance Prediction of Parallel Programs", IEEE 21st International WETICE, 2012, pp. 137-142.

Janiesch et al., "Business Activity Management for Service Networks in Cloud Environments", M W4SOC, Dec. 12, 2011; 6 Pages.

Antonescu et al., "Dynamic SLA Management with Forecasting Using Multi-Objective Optimization", Communication and Distributed Systems (CDS) Research Group, 7 Pages.

Davidson, "Beyond Fun: Serious Games and Media", ETC Press, 2008; 199 Pages.

Bonebakker, "Finding Representative Workloads for Computer System Design", 2007; 292 Pages.

Jun Zhu et al., "Twinkle: A Fast Resource Provisioning Mechanism for Internet Services", IEEE INFOCOM, 2011, pp. 802-810.

Sivadon Chaisiri et al., "Optimization of Resource Provisioning Cost in Cloud Computing", IEEE Transactions on Services Computing, Apr.-Jun. 2012, vol. 5, No. 2, pp. 164-177.

Beloglazov et al., "Adaptive Threshold-Based Approach for Energy Efficient Consolidation of Virtual Machines in Cloud Data Centers", Proceedings of the 8th International Workshop on Middleware for Grids, Clouds and e-Science, Nov. 29-Dec. 3, 2010; 6 Pages.

Jain et al., "A Threshold Band Based Model for Automatic Load Balancing in Cloud Environment", Cloud Computing in Markets Emerging (CCEM), 2013, pp. 1-7.

Owayedh, M.S., et al., "Identification of Temperature and Social Events Effects on Weekly Demand Behavior", IEEE, 2000, pp. 2397-2402.

Weinman, J., "Time is money: the value of on-demand", JoeWeinman.com, Jan. 7, 2011, 30 pages.

Weng. Y., et al., "Price spike forecasting using concept-tree approach based on cloud model", IEEE, 2009, Abstract.

Tirado, J.M., et al., "Predictive Data Grouping and Placement for Cloud-Based Elastic Server Infrastructures", IEEE, 2011, Abstract.

Paris, J.F., et al., "Delayed Chaining: A Practical P2P Solution for Video-on-Demand", IEEE, 2012, Abstract.

Jiu, R., et al., "A predictive judgment method for WLAN attacking based on cloud computing environment", IEEE, 2010, Abstract.

Lagar-Cavilla, HA, et al., "SnowFlock: Virtual Machine Cloning as a First-Class Cloud Primitive", ACM Transactions on Computer Systems (TOCS) Journal, 2011, 51 pages.

Terzis, A .. et al., "Wireless Sensor Networks for Soil Science", International Journal of Sensor Networks, vol. 7, Issue 1/2, Feb. 2010, 18 pages.

Erik Blasch et al., "Information Fusion in a Cloud-Enabled Environment" "Approved for Public Realease; Distribution Unlimited: 88ABW-2013-1114, Mar. 8, 2013", 25 pages.

Bontcheva et al.,"GATECloud.net: a platform for large-sclae,open-source text processing on the cloud" Phil. Trans.R Soc. A 2013371,20120071, Dec. 10, 2012, 14 pages.

Cai et al.,"A Cognitive Platform for Mobile Cloud Gaming", Cloud computing Technology and Science(CloudCom), 2013 IEEE 5th International Conference vol. 1, Publication Year 2013, pp. 72-79.

Georgakopoulos et al.. "Cognitive cloud-oriented wireless networks for the Future Internet"..Wireless Communications and Networking Conference Workshops (WCNCW). 2012 IEEE. pp. 431-435.

Jivanadham, L.B. et al.,"Cloud Cognitive Authenticator (CCA): A public cloud computing authentication mechanism", Informatics, Electronics & Vision (ICIEV), 2013 International Conference on May 17-18, 2013, pp. 1-6.

Wang et al., "Optimizing the cloud platform performance for supporting large-scale cognitive radio networks", Wireless Communications and Networking Conference (WCNC), 2012 IEEE Apr. 1-4, 2012, 3255-3260 pages.

Chun-Hsien et al.,"Cooperative spectrum sensing in TV White Spaces: When Cognitive Radio meets Cloud", Computer Communications Workshops (INFOCOM Wkshps), 2011 IEEE Conference on Apr. 10-15, 2011, 672-677.

Park et al.,"Cognitive cryptography plugged compression for SSLTLS-based cloud computing services", Journal ACM Transactions on Internet Technology (TOIT), vol. 11 Issue 2, Dec. 2011.

Lewis et al.,"Opportunities in cloud computing for people with cognitive disabilities: designer and user perspective", UAHCI'11 Proceedings of the 6th international conference on Universal access in human-computer interaction: users diversity—vol. Part II pp. 326-331.

(56) References Cited

OTHER PUBLICATIONS

Höyhtyä et al.,"Cognitive engine: design aspects for mobile clouds", CogART '11 Proceedings of the 4th International Conference on Cognitive Radio and Advanced Spectrum Management Article No. 32.

Chen et al., "Parameter Selection for Sub-hyper-sphere Support Vector Machine", Department of Computer Science & Technology, Third International Conference on Natural Computation (ICNC 2007), 4 pages.

Lin-cheng Zhou et al.,"QPSO-Based Hyper-Parameters Selection for LS-SVM Regression", Fourth International Conference on Natural Computation, 2008 IEEE, 4 pages.

Jeong et al., "Adaptive response mechanism based on the hybrid simulation and optimization for the real time event management", 2009 International Conference on New Trends in Information and Service Science, 6 pages.

Deusen et al.,"The Elements of Nature:Interactive and Realistic Techniques", University of Constance, Germany, Article 32, Jan. 2004. 406 pages.

Abraham et al.,"Survey of Spatio-Temporal Databases", Advanced Computing Research Centre, School of Computer and Information Science, University of South Australia,1999 Kluwer Academic Publishers, Boston, 39 pages.

Ullah et al., "Fuzzy Monte Carlo Simulation using point-cloud-based probability-possibility transformation", The Society for Modeling and Simulation International (SCS), vol. 89 Jul. 2013, 17 pages.

Babu et al.,Recovery and visualization of 3D structure of chromosomes from tomographic reconstruction images, Eurasip Journal of Applied Signal Processing, vol. 2006, Article ID 45684, 13 pages.

Zhou et a.,"Data-Parallel Octrees for Surface Reconstruction", IEEE Transactions on Visualization and Computer Graphics, vol. 17, No. 5, May 2011, 13 pages.

Ruthven et al., "Constructions of dynamic geometry: A study of the interpretative flexibility of educational software in classroom practice", Computers & Education 51, 2008, 21 pages.

Raad et al.,"Achieving Sub-Second Downtimes in Internet-wide Virtual Machine Live Migrations in LISP Networks", IFIP/IEEE International Symposium on Integrated Network Management (IM2013), 8 Pages.

Chen et al.,"Fitting a Surface to 3-D Points Using an Inflating Balloon Model", Institute for Robotics and Intelligent Systems, University of Southern California,1994 IEEE, 8 pages.

* cited by examiner

HYPERPARAMETER AND NETWORK TOPOLOGY SELECTION IN NETWORK DEMAND FORECASTING

TECHNICAL FIELD

The present invention generally relates to predicting demand for resources in a networked environment and, more particularly, to optimizing network demand forecasting models and network topology using hyperparameter selection.

BACKGROUND

Distributed network computing, such as cloud computing, typically involves service providers that maintain and provide shared computing resources that clients utilize via a communication network. For example, a client that owns or operates a website may utilize cloud resources to function as one or more website servers that host the website. The resources that are utilized by the client may include hardware and/or software that are part of a larger network of shared resources, e.g., a cloud environment, which is maintained by a service provider.

SUMMARY

In a first aspect of the invention, there is a method of allocating resources in a networked environment. The method includes defining a pool of features that are usable in models that predict demand of network resources, wherein the pool of features includes at least one historical forecasting feature and at least one event forecasting feature. The method also includes generating, using a computer device, an optimal model using a subset of features selected from the pool of features. The method further includes predicting future demand on a network using the optimal model. The method additionally includes allocating resources in the network based on the predicted future demand.

In a further aspect of the invention, there is a computer program product for allocating resources in a networked environment. The computer program product includes a computer readable storage medium having program instructions embodied therewith. The program instructions are executable by a computer device to cause the computer device to: select, by the computer device, a subset of features from a pool of features that includes at least one historical forecasting feature and at least one event forecasting feature; generate, by the computer device, an optimal model using the subset of features; predict, by the computer device, future demand on a network using the optimal model; and allocate, by the computer device, resources in the network based on the predicted future demand.

In a further aspect of the invention, there is a system for determining an optimal resource allocation in a networked environment. The system includes a CPU, a computer readable memory and a computer readable storage medium. Additionally, the system includes one or more program instructions. The program instructions are operable to instructions to define a plurality of logical partitions of network resources; determine the optimal resource allocation using an evolutionary algorithm process and the plurality of logical partitions; and allocate network resources based on the determined optimal resource allocation. The program instructions are stored on the computer readable storage medium for execution by the CPU via the computer readable memory.

In further aspects of the invention, a method of deploying a system allocating resources in a networked environment comprises providing a computer infrastructure being operable to provide the functionality of the present invention as described in any combination of features described below and/or shown in the figures. A method may include deploying a computer infrastructure for allocating resources in a networked environment, wherein the computer infrastructure is configured to: select, by a computer device, a subset of features from a pool of features that includes at least one historical forecasting feature and at least one event forecasting feature; generate, by the computer device, an optimal model using the subset of features; predict, by the computer device, future demand on a network using the optimal model; and allocate, by the computer device, resources in the network based on the predicted future demand.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
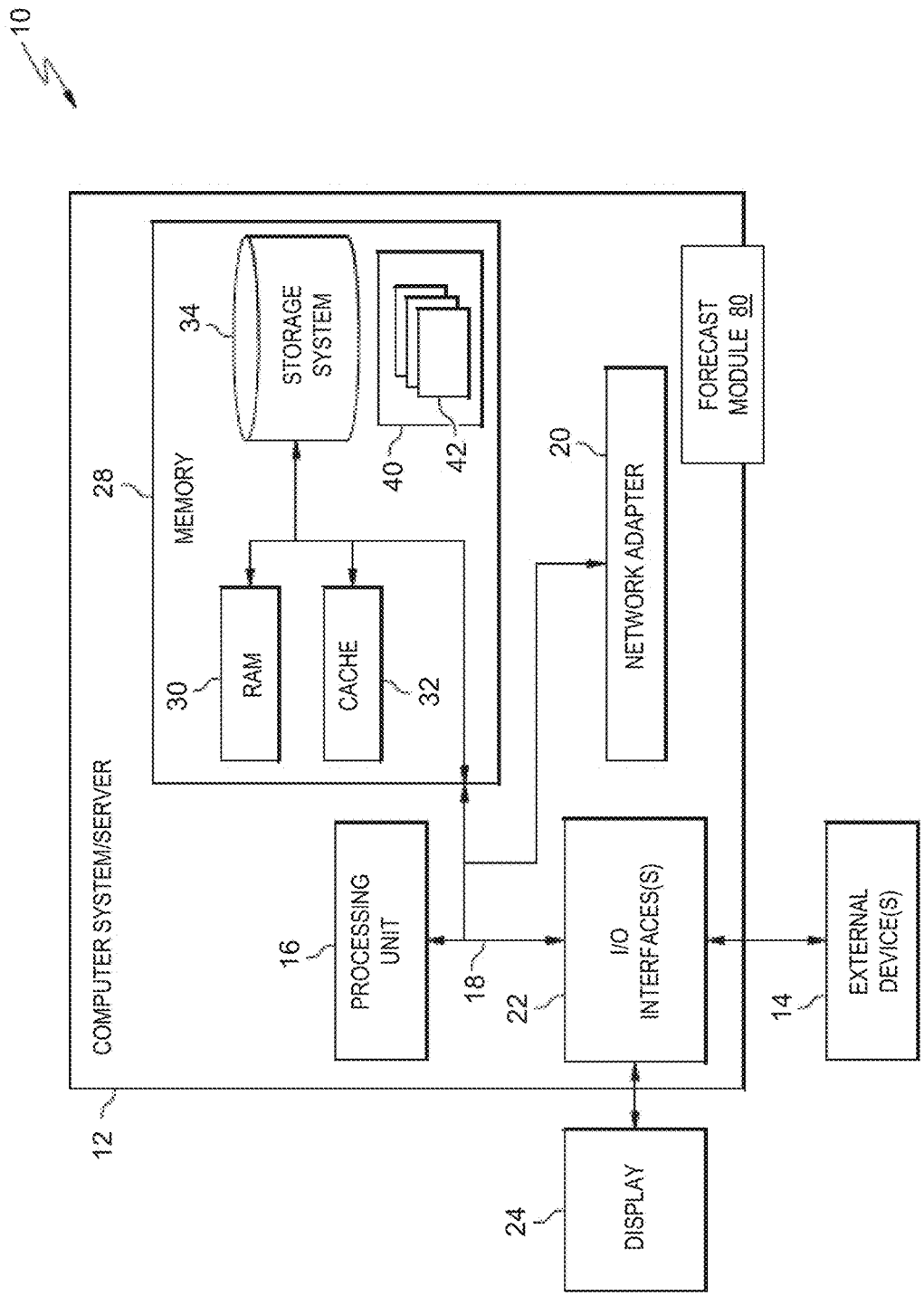
FIG. 1 is an example environment for implementing the steps in accordance with aspects of the present invention.

The present invention generally relates to predicting demand for resources in a networked environment and, more particularly, to optimizing network demand forecasting models and network topology using hyperparameter selection. In accordance with aspects of the invention, there are approaches for automating hyperparameter selection for a hybrid forecasting system that forecasts (e.g., predicts) demand on a network using a combination of cyclical and event based forecasting. In embodiments, an optimal model for predicting network demand is determined by performing hyperparameter selection of forecasters, functions, and/or parameters using evolutionary algorithm (EA) techniques. The model for predicting network demand may be used as a basis for allocating computing resources in a networked environment (e.g., a cloud environment) to ensure that adequate resources (e.g., website servers) are available to handle anticipated demand (e.g., website demand).

A service provider in the cloud environment typically has many clients utilizing many different resources. The service provider determines which particular resources are allocated to particular clients, and these allocations may change from time to time while the service provider strives to accommodate the various needs of all the clients simultaneously. The changing of cloud resource allocations can be done, for example, in response to changing conditions within the application (such as increased traffic) or to changing conditions within the environment (such as system outages, price changes from the service provider, etc.).

The allocation of cloud resources may also be changed based on predicted conditions, such as predicted future demand on a website. Forecasting demand on cloud resources ahead of the time horizon enables predictive provisioning of origin resources. Many forecasting schemes either rely on cyclical patterns or event bursts. In the rare case where an ensemble of forecasting paradigms are fused together, double the number of parameters are chosen before computation. For example, the features to use as predictors within event based forecasters and the cyclical window, averaging, and error functions for cyclical types are chosen before the system starts.

Implementations described herein include systems and methods to jointly select cyclical and event burst hyperparameters with an evolutionary algorithm to optimize cloud resource forecasting. In embodiments, a fitness function determines the best set of parameters for the ensemble forecasters, which can change over time given resource constraints of the system. As described herein, aspects of the invention include: joint event based and cyclical based hyperparameter selection; using artificial cloud environments to evaluate hyperparameter selections before changing actual cloud resources; using fitness functions that span event and cyclical forecasting; using a transfer function of best chromosomes to the cloud environment where the cloud is the genotype; and selecting forecasting postprocessors and preprocessors using hyperparameter selection.

Sporting event websites and project servers are good candidates to be hosted on a cloud due to the seasonal nature of the events. For example, major sporting event websites typically have a low amount traffic demand (e.g., website visits, views, etc.) for a majority of each year and a high amount of traffic demand for a short time period, e.g., one or two weeks, within each year. There may also be very large fluctuations in traffic demand, and thus computing and network demand, during the short time period of the events. It is thus advantageous for such systems to be easily provisioned for reacting quickly to demand changes. Accordingly, aspects of the invention involve generating a predictive model for predicting demand on network resources and allocating network resources based on the predicted demand. In embodiments, the predictive model is a hybrid model that combines historical forecasting and event forecasting. In embodiments, the predictive model is generated using hyperparameter selection and evolutionary algorithm techniques.

According to aspects of the invention, predictive cloud technology automatically allocates an appropriate level of computing power (e.g., website servers) to handle predicted future data demands during discrete events, such as professional golf and tennis tournaments. The computing supply curve leads the actual demand curve by following a predicted demand curve so that network resources (e.g., servers, etc.) are allocated ahead of time to prevent an unsustainable volume of user traffic. The overall forecasting may include pre-processing, event generation, feature extraction, ensemble of forecasters, post-processing, and merging.

The selection of features and algorithms to apply for a specific problem advantageously are robust such that they can be encoded into a search and optimization problem. High dimensional searching involves careful consideration to explore the least amount of space while finding a best solution or a pareto optimal hull. Evolutionary algorithms provide a parameterized framework for such searching. Within evolutionary algorithms, the fittest members or groups pass their respective characteristics to the next generation. The best fit members defined as a combination of data features and algorithms are optimally suited for a given environment or problem. Implementations of the invention utilize evolutionary algorithm techniques in hyperparameter selection for an optimal model that is used to predict future demand on network resources.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure including a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16 (e.g., CPU).

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, some or all of the functions of a forecast module 80 may be implemented as one or more of the program modules 42. Additionally, the forecast module 80 may be implemented as separate dedicated processors or a single or several processors to provide the functionality described herein. In embodiments, the forecast module 80 performs one or more of the processes described herein, including but not limited to: determining an optimal model for predicting network demand by performing hyperparameter selection of forecasters, functions, and/or parameters using evolutionary algorithm (EA) techniques; and allocating computing resources in a networked environment (e.g., a cloud environment) based on a demand prediction provided by the optimal model.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
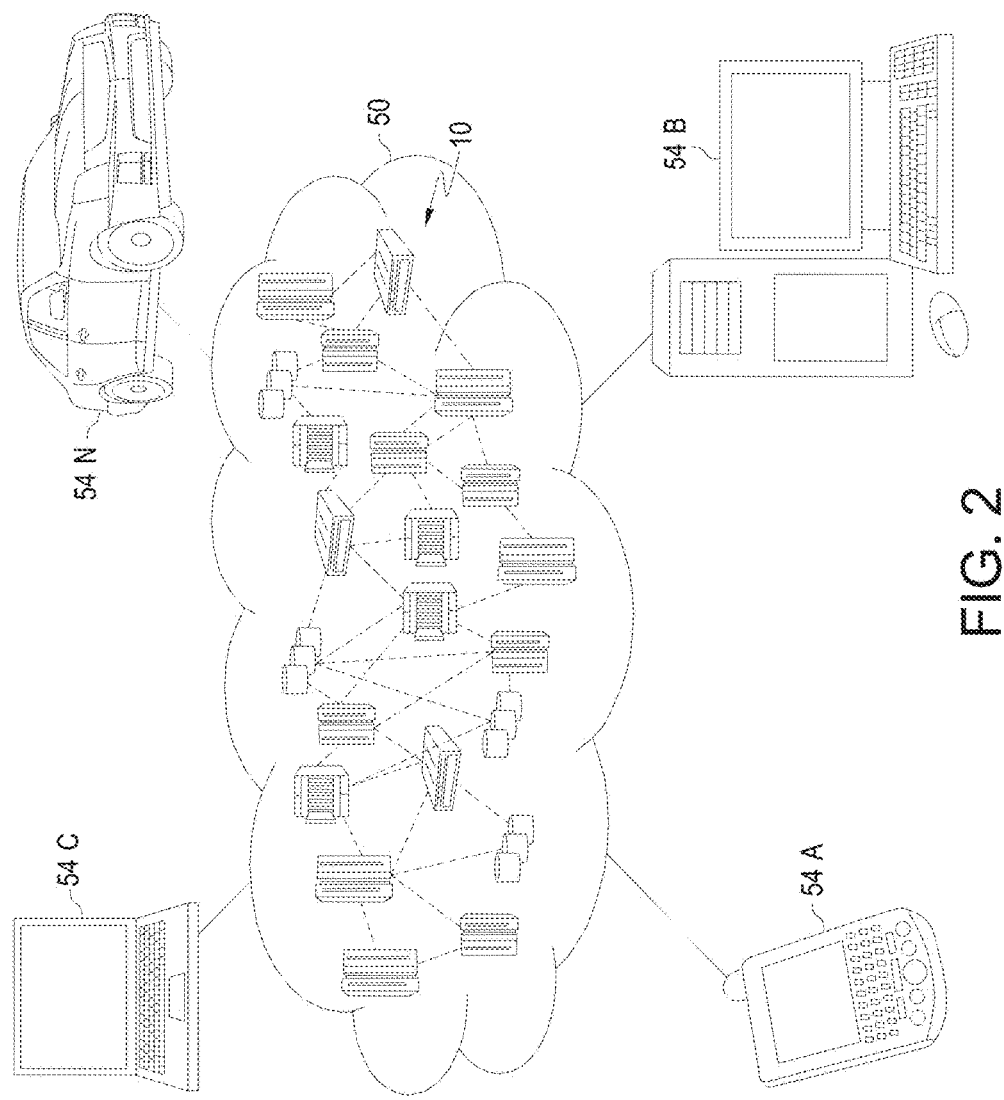
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
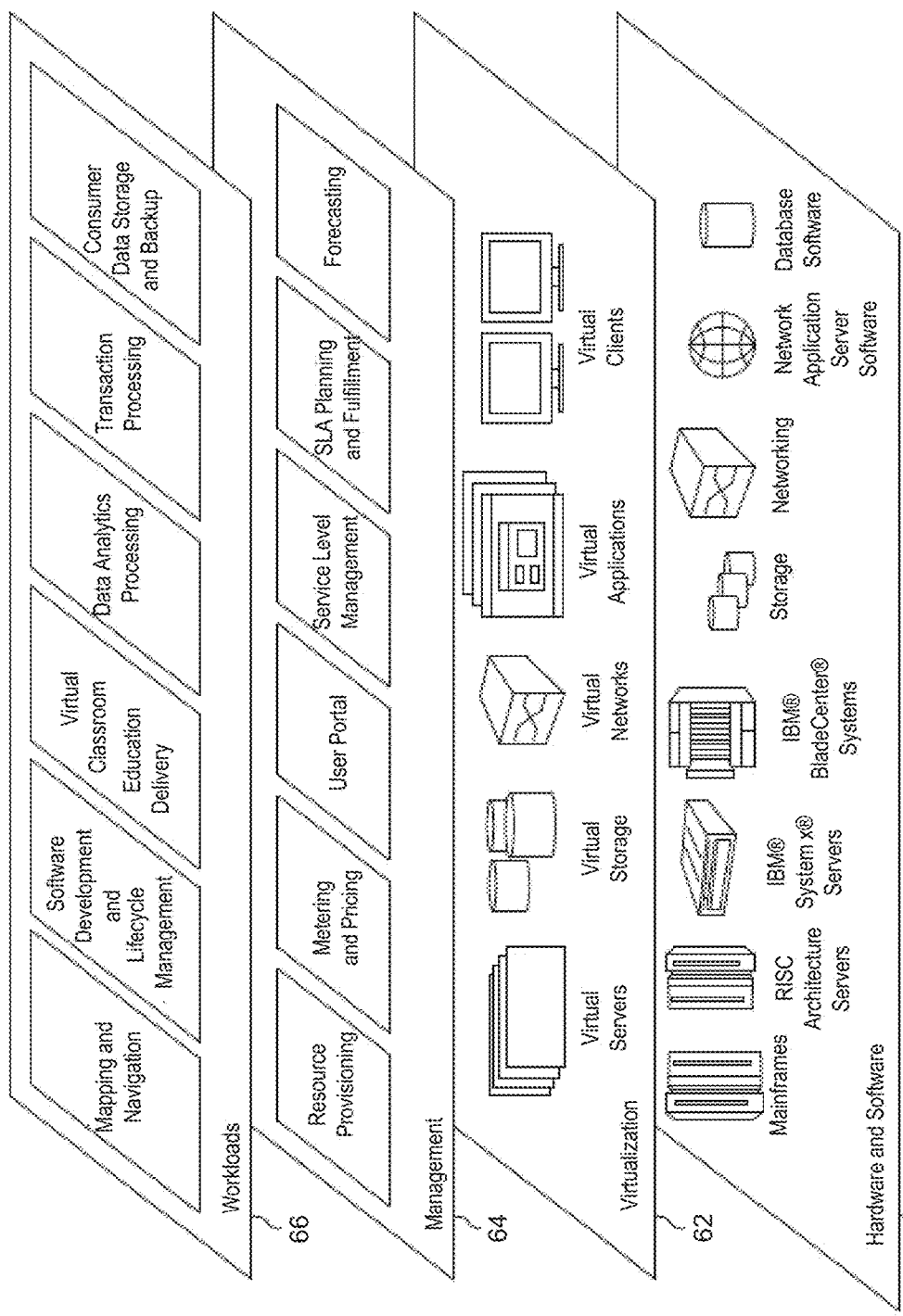
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Forecasting may include performing one or more of the processes of the forecast module 80 described herein, including but not limited to: determining an optimal model for predicting network demand by performing hyperparameter selection of forecasters, functions, and/or parameters using evolutionary algorithm (EA) techniques; and allocating computing resources in a networked environment (e.g., a cloud environment) based on a demand prediction provided by the optimal model.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup.

As will be appreciated by one skilled in the art, aspects of the present invention, including the forecast module 80 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Figure 4:
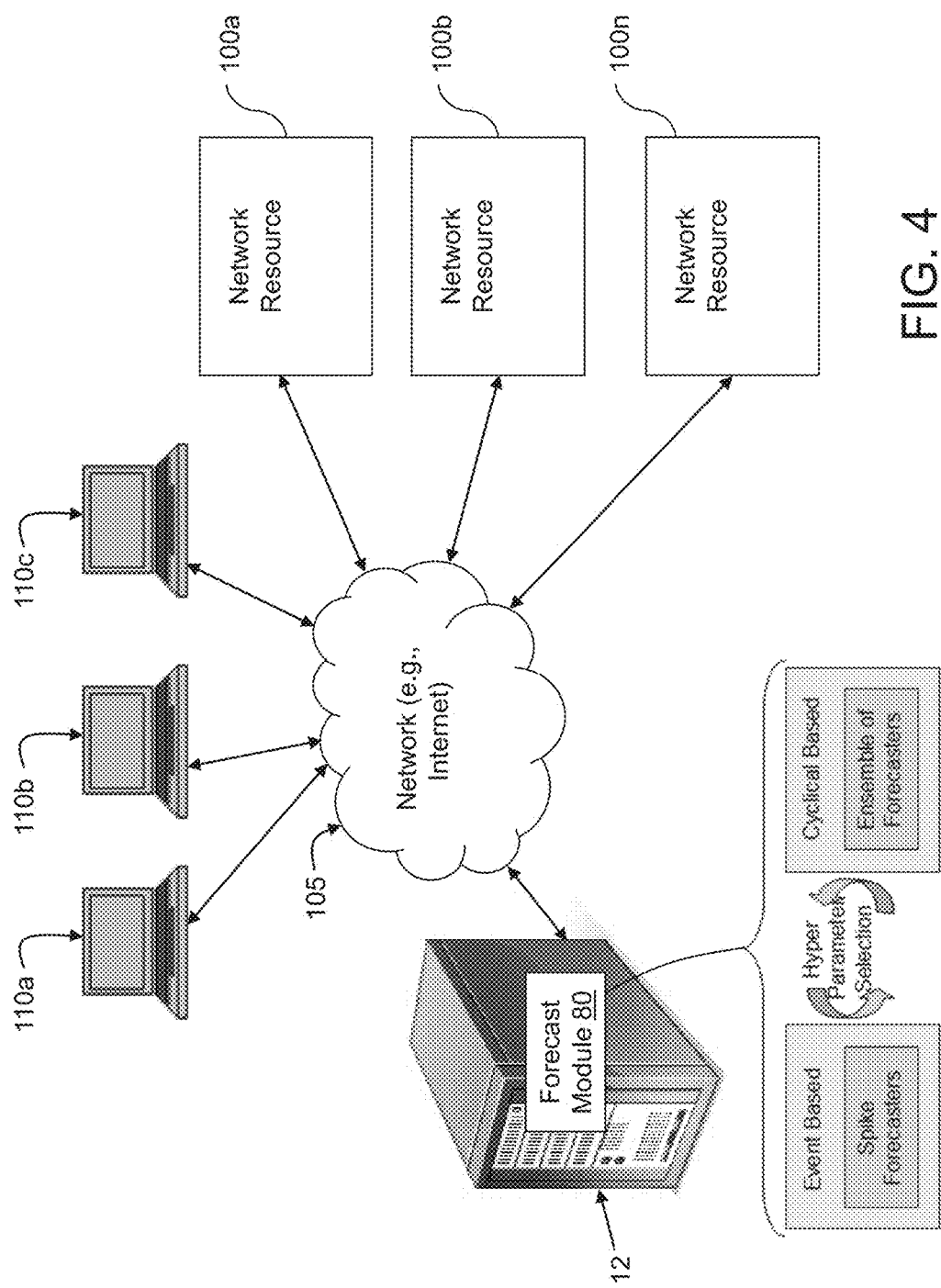
FIG. 4 depicts a block diagram of a network environment in accordance with aspects of the invention.

FIG. 4 depicts a block diagram of a network environment in accordance with aspects of the invention. In embodiments, any number of network resources 100a, 100b, . . . , 100n reside in a network 105, e.g., the Internet. Each resource 100a, 100b, . . . , 100n may comprise a node in the cloud, as depicted in FIG. 2, and may be provisioned to one or more clients as allocated by a cloud service provider. For example, one or more of the resources 100a, 100b, . . . , 100n may be provisioned to run a virtual machine that functions as a website server, e.g., for hosting a website associated with a sporting event. When a resource, e.g., resource 100a, runs a virtual machine that functions as a website server, the resource receives website requests from browsers of user computer devices 110a, 110b, . . . , 110n, and serves the website data to the user computer devices. The user computer devices 110a, 110b, . . . , 110n may be similar to local computing devices 54A-N as described with respect to FIG.

2. Any number of resources 100*a-n* and any number of user computer devices 110*a-n* may be connected to the network 105.

Still referring to FIG. 4, in accordance with aspects of the invention, a computer system/server 12 runs or communicates with the forecast module 80 (e.g., as described with respect to FIG. 1). The computer system/server 12 and forecast module 80 may be associated with a node 10 in the cloud (e.g., as depicted in FIG. 2), and may communicate with the resources 100*a*, 100*b*, . . . , 100*n* via the network 105. In embodiments, the forecast module 80 is configured (e.g., via programming) to generate an optimal model that predicts network demand based on a given pool of event based forecasters and cyclical based forecasters, as described in greater detail herein. In embodiments, the forecast module 80 generates the optimal model using hyperparameter selection and evolutionary algorithm techniques. In embodiments, the forecast module 80 runs an evolutionary algorithm simulation on a real cloud using historical data. The forecast module 80 uses the evolutionary algorithm to select an optimal set of forecasters, functions, and/or parameters that are collectively referred to as hyperparameters. In embodiments, the forecast module 80 uses the optimal model to generate a predicted future demand on a website, and then uses the predicted future demand on the website as a basis for allocating one or more of the resources 100*a-n* to accommodate the predicted future demand on the website.

Figure 5:
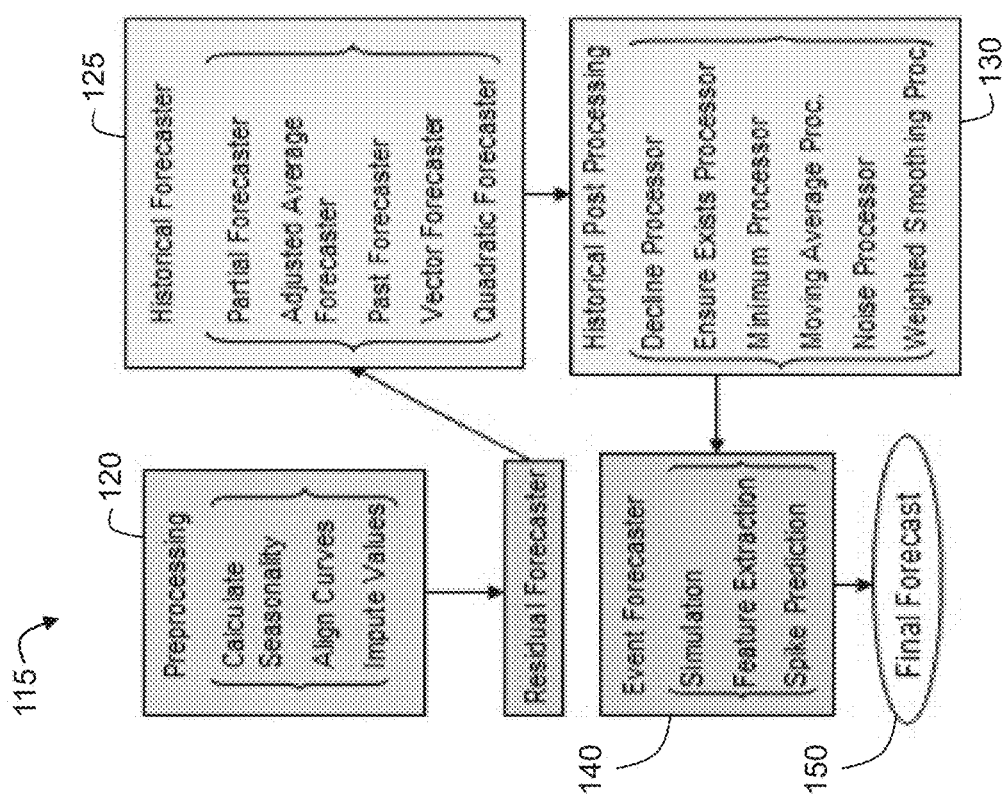
FIG. 5 depicts a block diagram of a hybrid forecasting architecture for predicting future demand of network resources in accordance with aspects of the invention.

FIG. 5 depicts a block diagram of a hybrid forecasting architecture 115 that may be used for forecasting (e.g., predicting) future demand on a website. The functionality of the hybrid forecasting architecture 115 may be programed in the forecast module 80 for execution by a computer device. As shown in FIG. 5, the architecture 115 includes preprocessing 120, historical forecasting 125, historical post-processing 130, event based forecasting 140, and final forecasting 150. The forecasting architecture 115 may be used to predict future demand on a website, e.g., during a sporting event. It is noted that aspects are described herein with respect to predicting website demand during sporting events; however, embodiments are not limited to sporting events, and implementations may be used for predicting demand on networked computing resources in other contexts.

According to aspects of the invention, preprocessing 120 includes preparing data for forecasting, e.g., preparing the data for use in the predictive model(s) used in historical forecasting 125. This may include, for example, statistical and data mining techniques such as normalizing data, binning of values, etc. The preprocessing may additionally or alternatively include functions such as: calculating seasonality; aligning curves; and imputing values. These functions may in turn have parameters that can be optimized (e.g., selected or de-selected for use) in a predictive model. For example, calculating seasonality may involve parameters defining monthly, weekly, and daily seasonality. Aligning curves may involve parameters defining a type of alignment, such as linear, quadratic, cubic, etc. And imputing values may involve parameters defining functions such as window averaging, interpolation, etc.

Still referring to FIG. 5, historical forecasting 125 may involve statistical and data mining analytics used to predict cyclical forecasts. In embodiments, cyclical forecasts are website demand forecasts that are based on historical data that is associated with a relatively long period of time extending from the present backward into the past (e.g., a year or more), and event forecasts are website demand forecasts that are based on real time data that is being generated with respect to current events. As a simplified illustrative example, historical forecasting may involve a numerical model that utilizes daily website demand for a particular sporting event website over the past ten years to generate a predicted daily demand for that website for the upcoming year.

FIG. 5 shows some exemplary types of historical forecasters including: partial forecaster; adjusted average forecaster; past forecaster; vector forecaster; and quadratic forecaster. Other types of historical forecasters include regression models and time series models. Further, each type of historical forecaster may have any number of parameters that define the numerical model of the forecaster. As but one example, an adjusted average forecaster involves shifting forecast demand curves to align the forecast demand curves with historical actual demand curves, and various parameters may be used in the adjusted average forecaster to define the shift.

Historical post-processing 130 as depicted in FIG. 5 may involve data mining and post-processing transformations of the forecasts that were generated in the historical forecasting 125. The historical post-processing functions may be used to transform and use the data as needed in a specific application, such as a particular yearly sporting event.

FIG. 5 shows some exemplary types of historical post-processing functions including: decline processor; ensure exists processor; minimum processor; moving average processor; noise processor; and weighted smoothing processor. Other types of historical post-processing functions include allowable range checks. Further, each type of historical post-processing function may have any number of parameters that are used in the post-processing. As but one example, an ensure exists processor may include parameters defining a number of standard deviations that are used in the model.

With continued reference to FIG. 5, the event forecaster 140 involves generating website demand forecasts that are based on real time data associated with current events. During a sporting event, the actual demand on a website may experience spikes that coincide with certain events. In the context of a popular yearly golf tournament, these events may include for example:

1) Featured Group players that have web accessible streaming coverage of golf play. The players within the group have been chosen as fan favorites that generally draw high demand.

2) Featured Holes are select portions of a golf course that are game differentiators. These holes may be associated with streaming content published on the web. This factor provides an additional prediction with respect to user demand.

3) Player Popularity is the degree in which golf fans want to follow and watch a particular player. Social sentiment from micro blogs may be used to scale the player popularity.

4) Playoff Prediction determines whether a playoff is likely to occur. A playoff is determined if currently playing golfers (e.g., current golfers) and those that have finished (e.g., club house golfers) could possibly tie. The predicted range for the players that are still playing may include an eagle to a double bogey. In the event a playoff is likely to occur, the predicted future demand is increased.

5) Proximity to Lead is used to determine the demand of the event when several players are within range of the winner's circle. If the round has not been completed, scores are predicted from historical game play information until all players have 18 scores. Standard statistics provide likely groups of players that could be a winner.

6) Web Exclusive refers to portions of the golf tournament are only available through the cloud. As a result, the predictor variable encodes how much user volume will change when a web exclusive event occurs.

Aspects of the invention use the event forecaster 140 to predict spikes in the demand of network resources based on real time data, such as social networking data. For example, implementations of the event forecaster 140 may analyze "Big Data" such as publicly available social networking sites, micro blogs, sentiment analysis, trending topics, etc., to determine a number of times a player is currently mentioned, and may utilize a numerical model to predict a spike in website demand based on this data. As depicted in FIG. 5, the event forecaster 140 may include functions such as: simulation; feature extraction; and spike prediction. Further, each one of these functions may have one or more parameters that define the model. For example, the simulation may include parameters that define a length of time into the future to run the simulation.

In accordance with aspects of the invention, the final forecast 150 depicted in FIG. 5 involves combining the cyclic forecast (e.g., of historical forecaster 125) with the spike forecast (e.g., of event forecaster 140) to generate a combined forecast demand curve. The combining (e.g., merging) may be defined by various functions and/or parameters associated with summing, weighting, timer averaging, etc.

Figure 6:
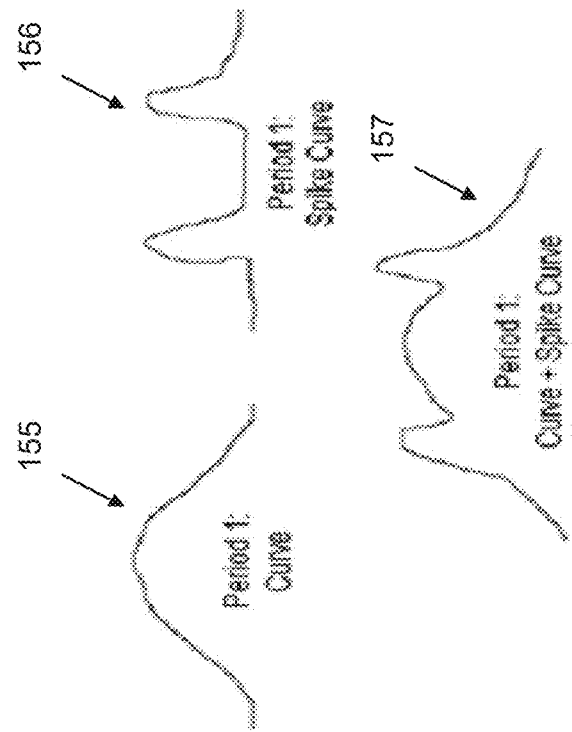
FIG. 6 depicts exemplary plots of predicted demand of network resources in accordance with aspects of the invention.

FIG. 6 illustrates an output of the forecasting architecture 115 as a predicted trend of future time versus user demand. For example, the combination of the preprocessing 120, the historical forecaster 125, and the historical post-processing 130 may generate a cyclic demand curve 155, in which the horizontal axis represents time and the vertical axis represents predicted website demand. Further, the event forecaster 140 may generate a spike demand curve 156, in which the horizontal axis represents time and the vertical axis represents predicted website demand. The final forecaster 150 merges the cyclic demand curve 155 and the spike demand curve 156 to create a combined demand curve 157, in which the horizontal axis represents time and the vertical axis represents predicted website demand. The combined demand curve 157 may be used as a basis for allocating networked resources (e.g., website servers, etc.) to accommodate anticipated demand (e.g., website traffic, views, visits, etc.).

As should be apparent from the description of FIGS. 5 and 6, the number of ways to numerically model an event, such as website demand, is infinite and limited only by the imagination of the person or persons creating the model. Even when a finite number of different forecasters, functions, and parameters are defined, the problem arises as to which ones of the forecasters, functions, and parameters should be included in a predictive model and which should be excluded. For example, certain ones of the forecasters, functions, and parameters may be redundant, and thus can be excluded from the predictive model to save computation resources in running the predictive model. As another example, certain ones of the forecasters, functions, and parameters may be less accurate than other ones, and thus can be excluded from the predictive model to save computation resources in running the predictive model. Aspects of the invention are thus directed to generating an optimal model based on a given pool of features e.g., forecasters, functions, and/or parameters. In embodiments, the optimal model is generated using hyperparameter selection and evolutionary algorithm techniques that determine which of the features (from the given pool of available features) to include in the model and which to exclude from the model.

Figure 7:
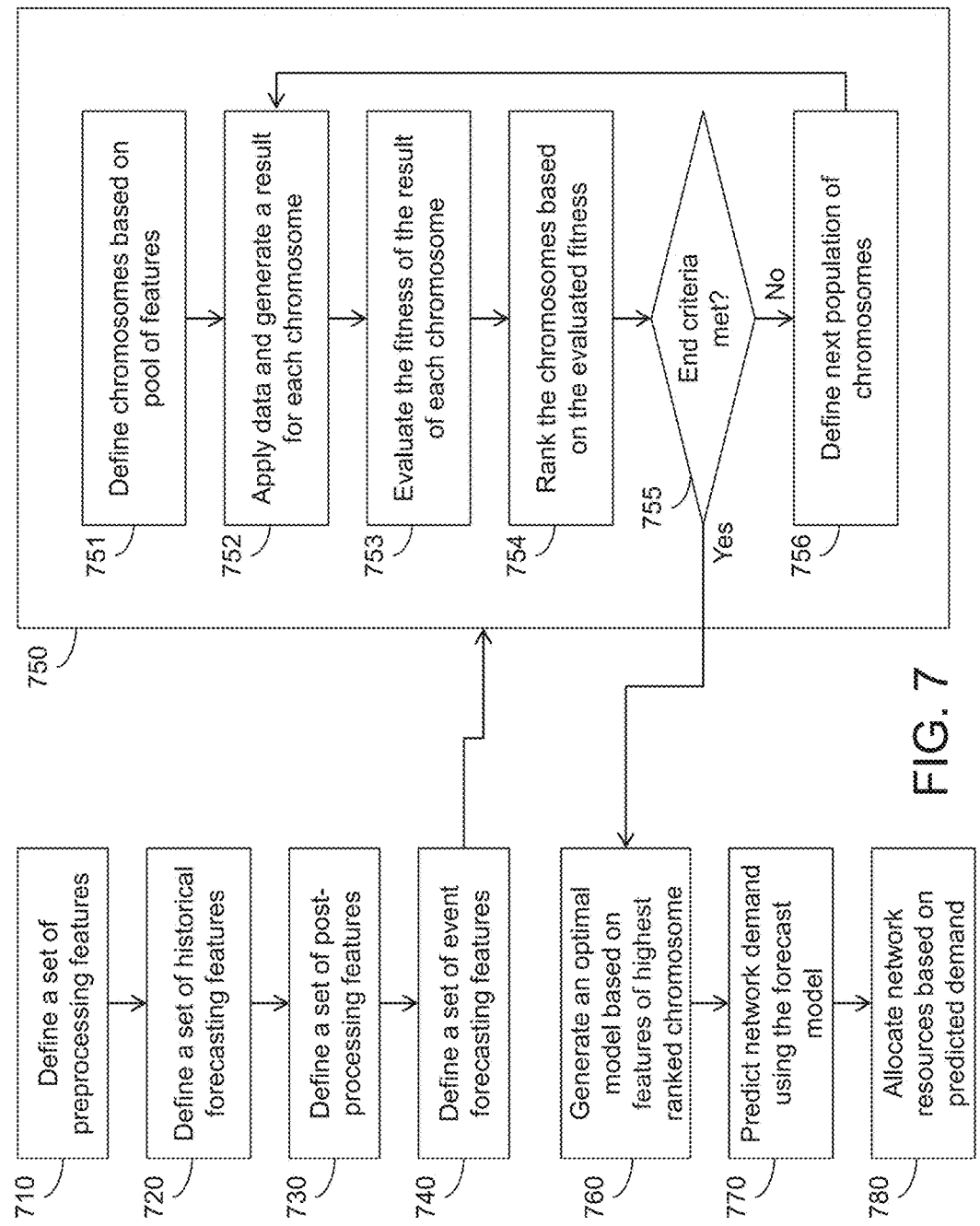
FIGS. 7 and 8 show exemplary flow diagrams of processes in accordance with aspects of the invention.
Figure 8:
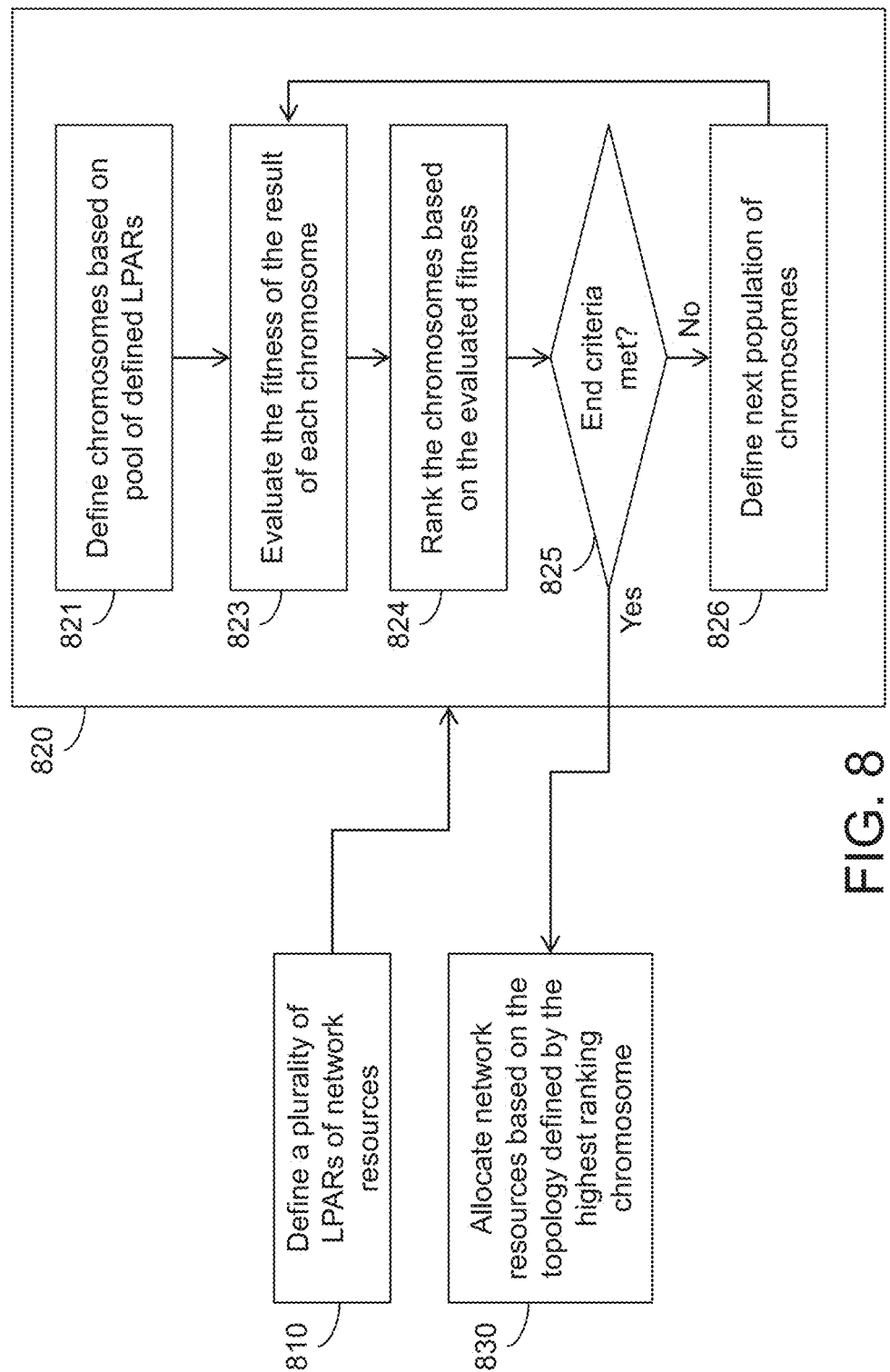

FIGS. 7 and 8 show exemplary flow diagrams of processes in accordance with aspects of the invention. The steps of FIGS. 7 and 8 may be implemented in the environments of and/or using the functionality described with respect to one or more of FIGS. 1-6, for example.

FIG. 7 is an example flow for determining an optimal model for forecasting network demand in accordance with aspects of the present invention. At step 710, a forecast module (e.g., forecast module 80 running on a computing device) defines a set of predefined preprocessing features. In embodiments, the preprocessing features may correspond to those described with respect to preprocessing 120 of FIG. 5. For example, the set of preprocessing features may include a first function for calculating seasonality, a second function for aligning curves, and a third function for imputing values. Other types of forecasters may also be used. Moreover, each feature (e.g., functions as described here) may have its own parameters that will be subject to hyperparameter selection. The defining may include, for example, identifying the preprocessing features and creating a data structure that defines the set of preprocessing features.

At step 720, the forecast module defines a set of predefined historical forecaster features. In embodiments, the historical forecaster features may correspond to those described with respect to historical forecaster 125 of FIG. 5. For example, the set of historical forecaster features may include: a first partial forecaster; a second adjusted average forecaster; a third past forecaster; a fourth vector forecaster; and a fifth quadratic forecaster. Other types of forecasters may also be used. Moreover, each feature (e.g., forecasters as described here) may have its own parameters that will be subject to hyperparameter selection.

At step 730, the forecast module defines a set of predefined historical post-processing features. In embodiments, the historical post-processing features may correspond to those described with respect to historical post-processing 130 of FIG. 5. For example, the set of historical post-processing features may include: a first decline processor function; a second ensures exists processor function; a third minimum processor function; a fourth moving average processor function; a fifth noise processor function; and a sixth weighted smoothing processor function. Other types of historical post-processing functions may also be used. Moreover, each feature (e.g., functions as described here) may have its own parameters that will be subject to hyperparameter selection.

At step 740, the forecast module defines a set of event forecaster features. In embodiments, the event forecaster features may correspond to those described with respect to event forecaster 140 of FIG. 5. For example, the set of event forecaster features may include: a first simulation function; a second feature extraction function; and a third spike prediction function. Other types of event forecaster functions may also be used. Moreover, each feature (e.g., functions as described here) may have its own parameters that will be subject to hyperparameter selection.

Steps 710, 720, 730, and 740 constitute defining a pool of features, all of which are predefined. For example, each of the features may comprise one or more predefined mathematical functions and/or algorithms that accept input data and generate output data. In accordance with aspects described herein, the forecast module is not directed to defining the mathematical functions and/or algorithms contained in the features in the first place, but rather the forecast module is configured to select an optimal combination of features from the pool of identified features for the purpose of constructing an optimal model for predicting demand. In embodiments, the optimal combination of features is a subset of the pool of available features.

At step 750, the forecast module identifies an optimal set of features from the features identified at steps 710, 720, 730, and 740 to use in an optimal model for predicting demand. In accordance with aspects of the invention, the forecast module is configured to use evolutionary algorithm techniques to determine which of the available features (i.e., identified at steps 710, 720, 730, and 740) to use and which not to use the optimal model.

In embodiments, step 750 includes step 751 in which the forecast module defines a population of a plurality of chromosomes based on the pool of available features identified at steps 710, 720, 730, and 740. Each chromosome may be a binary vector of length equal to the combined number of all the features of steps 710, 720, 730, and 740. A value of 1 at a position in the vector indicates the feature (forecaster/function) at this position in the chromosome is included in this chromosome's prediction model, while a value of 0 at the position in the vector indicates the feature at this position in the chromosome is excluded from this chromosome's prediction model. In this manner, each chromosome represents a predictive model with a unique combination of features from the pool of available features identified at steps 710, 720, 730, and 740.

Still referring to step 751, the chromosomes may have any desired degree of granularity and as such may have additional positions corresponding to parameters within certain ones of the features. For example, in one embodiment, each chromosome may have a single position that corresponds to the impute values pre-processing function. In other embodiments, however, each chromosome may have two positions related to the impute values pre-processing function: a first position in which the impute value pre-processing function uses window averaging, and a second position in which the impute values pre-processing function uses interpolation. In this manner, the chromosomes may be defined in a manner that takes into account certain parameters within the higher level functions, such that the parameters are also subject to the hyperparameter selecting.

In embodiments, step 750 includes step 752 in which the forecast module generates a result for each chromosome. In embodiments, the forecast module uses actual data to generate a respective demand prediction using each respective chromosome with its unique combination of features. The actual data is historical data from a real cloud and is used as the inputs for the predefined features that are contained in the chromosomes.

In embodiments, step 750 includes step 753 in which the forecast module evaluates the fitness of the generated result of each chromosome. In embodiments, the forecast module compares the demand prediction of each chromosome (calculated at step 752) to the actual demand associated with the actual data. Since the actual data used at step 752 is historical data from a real cloud, there is a corresponding actual demand for the same cloud and time period of the actual data. In embodiments, the forecast module uses a fitness function to assign a score to each chromosome based on that chromosome's demand prediction from step 752. The fitness function may be any suitable function that quantifies a difference between the demand prediction of a chromosome and the actual demand. For example, the demand prediction and the actual demand may each be a curve of website demand versus time, and the fitness function may be a function that integrates the area under each curve and calculates a difference between the areas. The score assigned to a chromosome may be based on this calculated difference between the areas. For example, a chromosome with a relatively small calculated difference between the areas may be assigned a higher score than a chromosome with a relatively large calculated difference between the areas. In this manner, the score assigned to a chromosome represents a quantified difference between the demand prediction and the actual demand for that chromosome.

In embodiments, step 750 includes step 754 in which the forecast module ranks each of the chromosomes based on their evaluated fitness, e.g., the score that was assigned at step 753. For example, the chromosomes may be ranked from highest to lowest score.

In embodiments, step 750 includes step 755 in which the forecast module determines whether an end criteria is met. The end criteria may be defined, for example, as a number of iterations of step 750 and/or convergence such as less than a predefined amount of change between iterations. When the end criteria are met, the process proceeds to step 760, which is described below. When the end criteria are not met, the process proceeds to step 756 where a next population is generated for a next iteration.

In embodiments, step 750 includes step 756 in which the forecast module generates a next population of chromosomes based on the current population of chromosomes (from step 751) and the rankings (from step 754). In embodiments, the forecast module is programmed with evolutionary algorithm techniques to breed the next population of chromosomes using, for example, crossover, mutation, etc. This step may involve, for example, keeping a certain number of the highest ranked chromosomes unchanged. This step also may involve, for example, changing the included/excluded features of other ones of the chromosomes, e.g., by changing the values of the 1's and 0's at various positions in the vectors that define the chromosomes. The changing of the included/excluded features of other ones of the chromosomes may be based at least partly on one or more of the features of the highest ranked chromosomes, random mutation, and other evolutionary algorithm techniques. The next population of chromosomes generated at step 756 is then used at step 752 in a next iteration of the evolutionary algorithm.

At step 760, the forecast module generates an optimal model based on the optimal set of features that was identified using evolutionary algorithm techniques at step 750. The chromosome with the highest rank in the last iteration of step 750 contains the determined optimal set of features that are used in the optimal model. In embodiments, the forecast module generates the optimal model by creating a data structure and/or program that defines and/or includes the mathematical functions and/or algorithms of the optimal set of features.

At step 770, the forecast module uses the optimal model (from step 760) to predict actual network demand. For example, the forecast module inputs data from an actual cloud into the optimal model, which generates a curve of predicted future demand versus time (e.g., such as that shown in FIG. 6).

At step 780, the forecast module allocates actual cloud resources using the demand that was predicted at step 770. In embodiments, the forecast module sends messages to network resources (such as one or more of resources 100*a-n*) to make more or less resources available, e.g., as a website server, at a certain time in the future based on the prediction.

FIG. 8 is an example flow for determining an optimal network topology (e.g., cloud resource configuration) for handling predicted network demand in accordance with aspects of the invention. In embodiments, the forecast module may be configured to determine an optimal cloud resource configuration using hyperparameter selection and evolutionary algorithm techniques. For illustrative purposes, consider a sporting event example in which holes in a golf game or sets in a tennis matches can be seen as a series of events in the probabilistic sense. Each probabilistic event (e.g., like predicting the next actions of a certain player, collecting audience feedback, tracking the movement of the ball, etc.) requires the system to provide different types of network resources. A best combination of network resources and amounts thereof is assumed to exist for each type of probabilistic event, and in aspects of the invention the forecast module is configured to determine this best combination of network resources. Combinations of network resources may be represented by logical partition (LPARs) of overall available network resources (e.g., resources 100a-n of FIG. 4). In embodiments, each LPAR can be represented as a 5-tuple of values for CPU load, disk space, I/O, RAM, and network hops.

With continued reference to FIG. 8, at step 810 the forecast module (e.g., forecast module 80 running on a computing device) defines a plurality of LPARs of network resources (e.g., network resources 100a-n) based on actual data from a real cloud. In embodiments, each LPAR is defined using a 5-tuple data structure that includes values for the following parameters associated with the LPAR: CPU load, disk space, I/O, RAM, and network hops.

At step 820, the forecast module identifies an optimal cloud resource configuration using evolutionary algorithm techniques. In embodiments, step 820 includes step 821 in which the forecast module defines a population of a plurality of chromosomes based on the LPARs defined at step 810. In embodiments, the cloud is the chromosome and the LPARs combined with a type of probabilistic event they are supposed to process are the genes on that chromosome. The population upon which the genetic algorithm is operating is a set of clouds and genetic dynamics to be defined by crossover events and mutations.

In embodiments, step 820 includes step 823 in which the forecast module evaluates the fitness of each chromosome, e.g., by assigning a score to each chromosome using a fitness function. According to aspects of the invention, a fitness function is defined that measures the performance of the 5-tuple for each LPAR in combination with its probabilistic event. The overall performance of the cloud (e.g., chromosome) may be a weighted average of the performance of its LPARs, where the lower performing LPARs receive a larger weight than the higher performing ones. This approach steers against the indefinite growing of LPAR sequences by overly punishing the low-performing or medium performing LPARs, and follows the logic that a chain is only as strong as its weakest link. The reason that not all LPARs can receive optimal resource allocation from the beginning lies in the resource constraints of the cloud, so the resources available have to be divided such that the overall good is optimized, although that it may result in individual LPARs not performing optimally.

In embodiments, the overall fitness function for the cloud (e.g., chromosome) incorporates a ranking of probabilistic event types. This ranking assists, for example, in selecting one of two types of events that can be supported when there is a resource constraint. Such a ranking can be obtained by pair wise comparing of probabilistic event types and applying an Analytical Hierarchy Process.

Aspects of the invention may also include defining how a typical game or other event is represented as a sequence of LPARs, e.g., the expected proportions of the probabilistic event types. In embodiments, constraints are defined to prevent the system from converging everywhere towards the LPAR with the lowest resource requirements (in which case the final genome would consist of a sequence of just this event type). Any suitable statistical analysis may be performed to establish expected proportions of probabilistic event types and their variances, and this information may be entered into the calculation of the fitness of a chromosome (e.g., a cloud) in the form of a fitness deduction if the proportion of any required LPAR is outside the tolerance value established by the statistical investigation.

In embodiments, step 820 includes step 824 in which the forecast module ranks each of the chromosomes based on their evaluated fitness, e.g., the score that was assigned at step 823. For example, the chromosomes may be ranked from highest to lowest score.

In embodiments, step 820 includes step 825 in which the forecast module determines whether an end criteria is met. The end criteria may be defined, for example, as a number of iterations of step 820 and/or convergence such as less than a predefined amount of change between iterations. When the end criteria are met, the process proceeds to step 860, which is described below. When the end criteria are not met, the process proceeds to step 826 where a next population is generated for a next iteration.

In embodiments, step 820 includes step 826 in which the forecast module generates a next population of chromosomes based on the current population of chromosomes (from step 821) and the rankings (from step 824). In embodiments, the forecast module is programmed with evolutionary algorithm techniques to breed the next population of chromosomes using, for example, crossover, mutation, etc. This step may involve, for example, keeping a certain number of the highest ranked chromosomes unchanged. This step may involve, for example, changing other ones of the chromosomes using crossover and/or mutation. Crossover events are events during which two clouds are split and one end of the first cloud is added to the other end of the second cloud and vice versa, so the collection and sequence of LPARs within a cloud will be affected by keeping the involved LPARs unchanged. Mutation, on the other hand, changes the LPARs, and so reduces or increases one of the values of the 5-tuple, e.g., CPU load, disk space, I/O, RAM, and network hops. The next population of chromosomes generated at step 826 is then used at step 823 in a next iteration of the evolutionary algorithm.

At step 830, the forecast module allocates actual network resources based on the results of step 820. For example, the highest ranked chromosome in the last iteration of step 820 is deemed to define an optimal cloud topology. In embodiments, the forecast module sends messages to one or more network resources (e.g., resources 100a-n) that instruct the resources to be arranged in the manner defined by the LPARs of the highest ranking chromosome from step 820.

Implementations of the invention as described herein provide enhanced prediction of future workloads of a pool of cloud resources. This enhanced prediction is advantageous in that it provides for physical hardware planning and optimization. A more accurate view of future cloud use can be used to create a more accurate plan of how much hardware to acquire and provision at points in time in the future. The enhanced prediction also provides a power usage benefit. An accurate view of future load on cloud resources can be used to manage and plan power usage in an efficient manner. The enhanced prediction also provides benefits in Quality of Service for workloads. Accurate predictions of future workloads allows for planning to handle those workloads, which improves Quality of Service by reducing unintended outages. The enhanced prediction also provides benefits in license costs of cloud resources. For example, when sub-capacity licensing is used, predictive cloud resourcing provides accurate views on software licensing cost requirements, which in turn has implications for bulk discounts and tiered discounting levels. Accurate license planning can thus be achieved by having a clear picture of the minimum and maximum foreseeable workload.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of allocating resources in a networked environment, comprising:
    defining a pool of features that are usable in models that predict demand of network resources, wherein the pool of features includes at least one historical forecasting feature which comprises a cyclical demand forecast and at least one event forecasting feature which comprises an analysis of trending topics on a social networking site;
    generating, using a computer device, a plurality of models, each model using a unique subset of both historical forecasting features relating to cyclic demand and event forecasting features relating to spike demand on a network, selected from the pool of features;
    determining, using the computer device, a relative fitness of each of the plurality of models by testing each of the plurality of models using historical data;
    determining, using the computer device, an optimal model from among the plurality of models based upon the determined relative fitness of each of the plurality of models, the optimal model includes a combined forecast curve generated from both the historical forecasting features relating to cyclic demand and event forecasting features relating to spike demand;
    predicting future demand on the network using the optimal model; and
    allocating resources in the network based on the predicted future demand by allocating additional servers to the network for handling the predicted future demand,
    wherein the event forecasting features are used to predict the spike demand based on a number of times at least one of the trending topics is mentioned on the social networking site.

2. The method of claim 1, wherein the defining the pool of features comprises:
    defining a set of preprocessing features;
    defining a set of historical forecasting features including the at least one historical forecasting feature;
    defining a set of post-processing features; and
    defining a set of event forecasting features including the at least one event forecasting feature.

3. The method of claim 2, wherein:
    the set of preprocessing features includes a plurality of preprocessing functions including a first preprocessing function which calculates seasonality, a second preprocessing function which aligns curves, and a third preprocessing function which inputs values;
    the set of historical forecasting features includes a plurality of historical forecasters including an adjusted average forecaster;
    the set of post-processing features includes a plurality of post-processing functions including an ensure exists function; and
    the set of event forecasting features includes a plurality of event forecasters including a first event forecaster function for simulation; a second event forecaster function for feature extraction; and a third event forecaster function for spike prediction.

4. The method of claim 3, wherein the subset of features selected includes: one of the plurality of preprocessing functions, one of the plurality of historical forecasters, one of the plurality of post-processing functions, and one of the plurality of event forecasters.

5. The method of claim 3, wherein:
    the plurality of historical forecasters predict the cyclic demand; and
    the plurality of event forecasters predict the spike demand.

6. The method of claim 1, further comprising using an evolutionary algorithm process in the generating the plurality of models.

7. The method of claim 6, wherein the evolutionary algorithm process comprises:
    defining a plurality of chromosomes based on combinations of features from the pool of features, wherein a length of a chromosome is a binary vector of length greater than the number of features;
    evaluating a fitness of each one of the plurality of chromosomes; and
    ranking the plurality of chromosomes based on the evaluated fitness.

8. The method of claim 7, wherein, based on the ranking, a highest ranked one of the plurality of chromosomes includes a combination of features that defines the subset of features used in the optimal model.

9. The method of claim 1, wherein:
    the resources in the network are website servers; and
    the predicted future demand is predicted traffic on a website.

10. The method of claim 9, wherein the allocating the resources in the network comprises sending at least one instruction to at least one of the website servers to be available for a predicted increase in traffic on the website and wherein the allocating the resources in the network comprises following a predicted demand curve.

11. The method of claim 1, wherein a service provider at least one of creates, maintains, deploys and supports computer infrastructure that includes the computer device.

12. The method of claim 1, wherein steps of claim 1 are provided by a service provider on a subscription, advertising, and/or fee basis.

13. The method of claim 1, wherein, for each of the plurality of models, the relative fitness of the model is determined based on a difference between a demand predicted by the model and an actual historical demand.

14. A computer program product for allocating resources in a networked environment, the computer program product comprising a computer readable storage medium having program instructions embodied therewith, the program instructions being executable by a computer device to cause the computer device to:
define, by the computer device, a pool of features that includes at least one historical forecasting feature which comprises a cyclical demand forecast and at least one event forecasting feature which comprises an analysis of trending topics on a social networking site, wherein the pool of features excludes redundant features and the features in the pool of features are all predefined;
generate, by the computer device, a plurality of models, each model using a unique subset of both historical forecasting features relating to cyclic demand and event forecasting features relating to spike demand selected from the pool of features;
determine, using the computer device, a relative fitness of each of the plurality of models by testing each of the plurality of models using historical data;
determine, by the computer device, an optimal model from among the plurality of models based upon the determined relative fitness of each of the plurality of models;
predict, by the computer device, future demand on a network using the optimal model; and
allocate, by the computer device, resources in the network based on the predicted future demand by allocating additional servers to the network for handling the predicted future demand,
wherein the event forecasting features are used to predict the spike demand based on a number of times at least one of the trending topics is mentioned on the social networking site.

15. The computer program product of claim 14, wherein the pool of features includes:
a plurality of preprocessing functions;
a plurality of historical forecasters including the at least one historical forecasting feature;
a plurality of post-processing functions; and
a plurality of event forecasters including the at least one event forecasting feature.

16. The computer program product of claim 15, wherein:
the plurality of preprocessing functions are selected using an evolutionary algorithm process;
the plurality of post-processing functions are selected using the evolutionary algorithm process;
the plurality of historical forecasters predict the cyclic demand; and
the plurality of event forecasters predict the spike demand.

17. The computer program product of claim 14, wherein the program instructions cause the computer device to use an evolutionary algorithm process in the generating the plurality of models and the relative fitness of each of the plurality of models is further tested using the historical forecasting features and the event forecasting features.

18. The computer program product of claim 14, wherein:
the resources in the network are website servers;
the predicted future demand is predicted traffic on a website with seasonal traffic demand; and
the allocating the resources comprises sending at least one instruction to at least one of the website servers to be available for a predicted increase in traffic on the website.

19. A system for determining an optimal resource allocation in a networked environment, comprising:
a CPU, a computer readable memory and a computer readable storage medium;
program instructions to define each of a plurality of logical partitions of network resources using a data structure that includes values for a CPU load, disk space, input/output (IO), random access memory (RAM), and network hops that is based on data from a real cloud network;
program instructions to determine the optimal resource allocation using an evolutionary algorithm process and the data structure of each of the plurality of logical partitions; and
program instructions to allocate network resources based on the determined optimal resource allocation,
wherein:
the program instructions are stored on the computer readable storage medium for execution by the CPU via the computer readable memory;
the evolutionary algorithm process includes using historical forecasters that predict cyclic demand and testing using historical data;
the evolutionary algorithm process includes using event forecasters to predict the spike demand based on a number of times a topic is mentioned on a social networking site; and
the evolutionary algorithm process includes defining chromosomes, breeding a next population of chromosomes using crossover and mutation, and a fitness deduction when an expected proportion of probabilistic events types and probabilistic event variances of any required logical partitions of network resources is outside a tolerance value established by a statistical investigation.

20. The system of claim 19, wherein the plurality of logical partitions are defined based on data of the real cloud network and testing using historical data includes comparing the predicted cyclic demand to real cloud historical data, the predicted cyclic demand was predicted from the historical forecasters.

21. The system of claim 19, wherein:
each one of the chromosomes represents a respective cloud with a unique network topology, wherein a length of a chromosome is a binary vector of length equal to all features and functions; and
respective ones of the plurality of logical partitions and type of probabilistic events are genes on the chromosomes.

* * * * *